May 31, 1927.
H. M. SCHWAB
COOKING UTENSIL
Filed Aug. 17, 1926
1,630,806
2 Sheets-Sheet 1
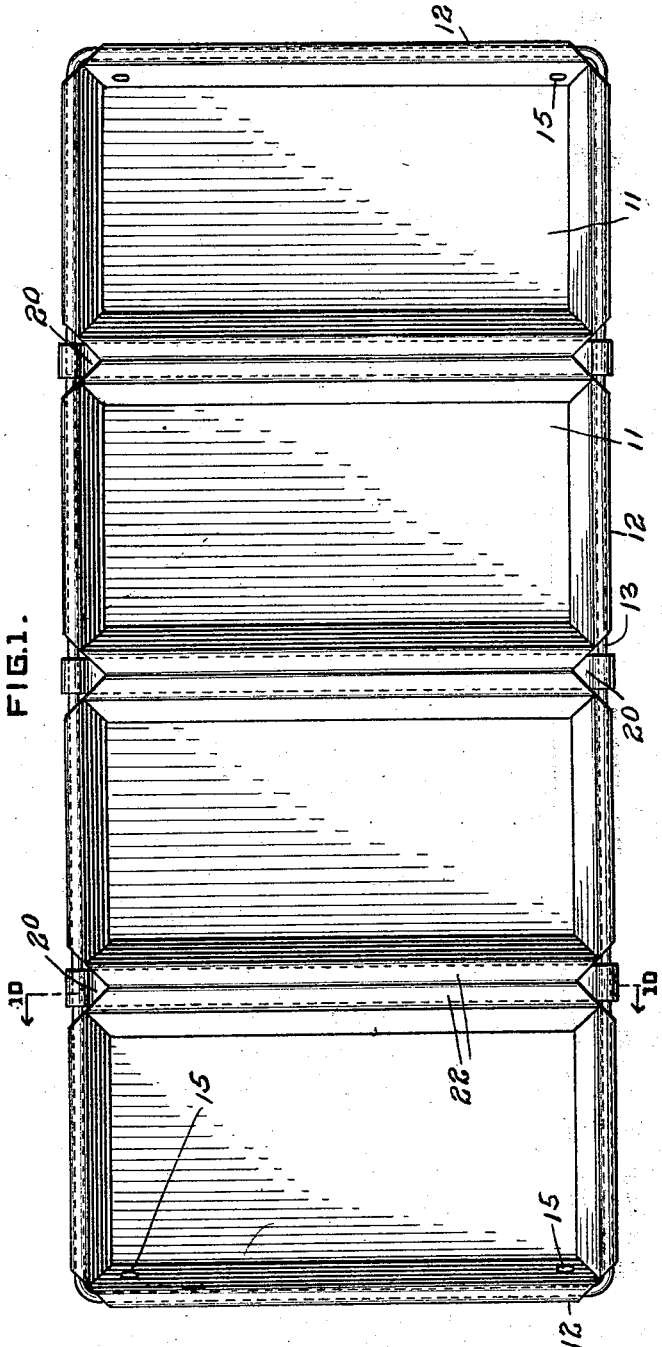
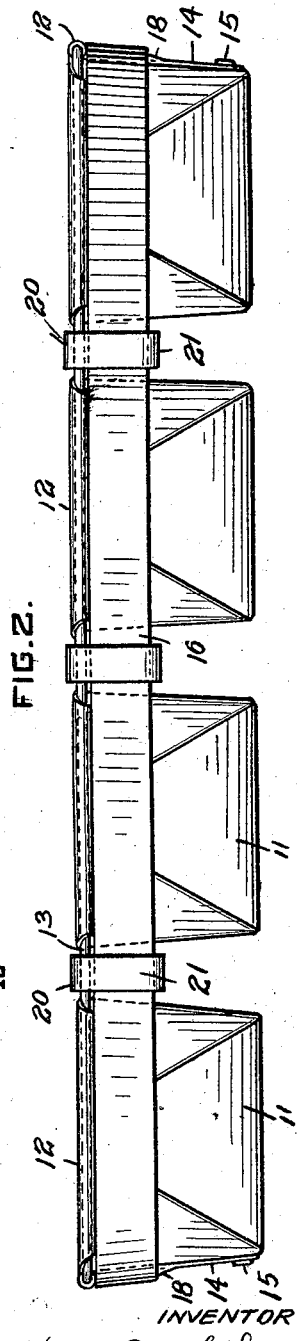

May 31, 1927.
H. M. SCHWAB
COOKING UTENSIL
Filed Aug. 17, 1926
1,630,806
2 Sheets-Sheet 2
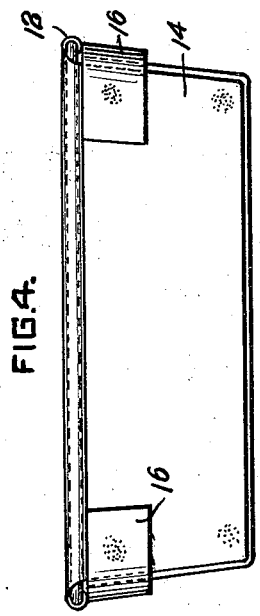
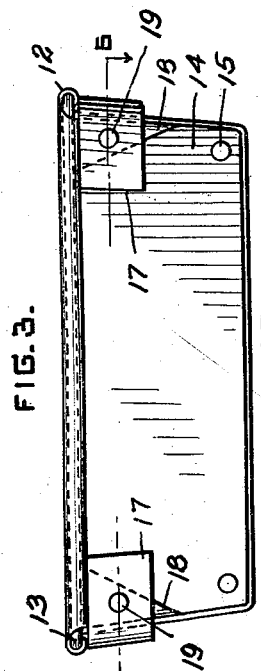
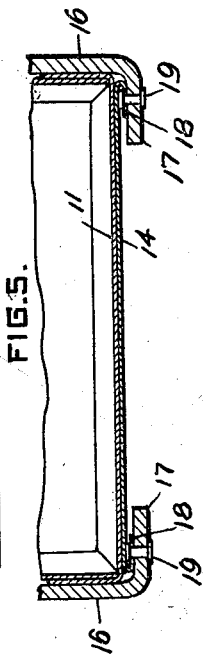
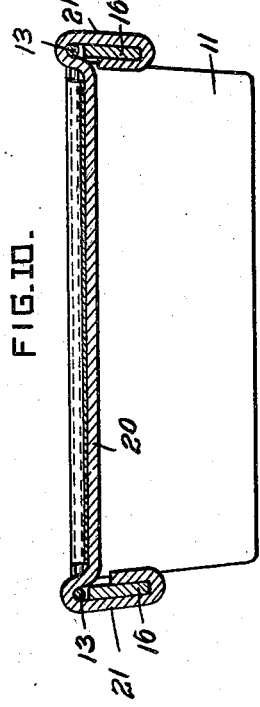
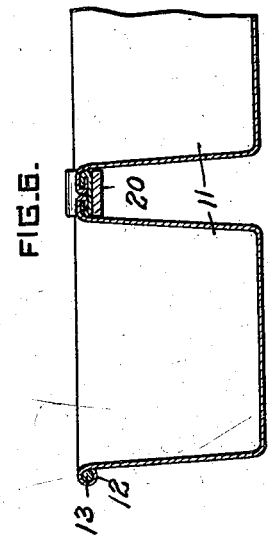
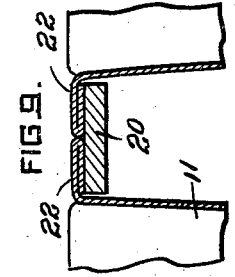
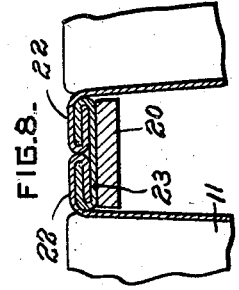
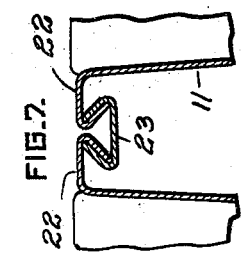
WITNESSES
INVENTOR
Henry M. Schwab
By Green & McAllister
His Attorneys Patented May 31, 1927.

1,630,806

UNITED STATES PATENT OFFICE.

HENRY M. SCHWAB, OF DORMONT, PENNSYLVANIA, ASSIGNOR TO BYRNES & KIEFER COMPANY, A CORPORATION OF PENNSYLVANIA.

COOKING UTENSIL.

Application filed August 17, 1926. Serial No. 129,786.

This invention relates to cooking utensils and more particularly to baking pans of the type where a plurality of small bread pans or the like are secured together to form a unitary structure for the simultaneous baking of a plurality of articles such, for example, as loaves of bread.

Utensils of this type are employed in hotel kitchens or wherever a large amount of cooking is carried on. In the assembly the small pans are usually permanently secured together to form a unit by an arrangement of straps or bands which surround the assembled units and to which they are secured by rivets. The presence of rivet heads on the interior of the bread pans is highly objectionable for the reason that such heads, being of steel, frequently rust and become discolored and also because they produce undesirable marks on the finished loaves of bread.

An object of this invention is to provide a device of the type set forth of such construction and arrangement that the various individual pans will be rigidly secured together without the necessity of employing rivets for this purpose as heretofore believed to be necessary.

A further object is to provide a device of the type set forth which will be simple and cheap to manufacture and rugged and durable in construction.

These and other objects which will be apparent to those skilled in this particular art are accomplished by means of this invention, one embodiment of which is shown for the purposes of illustration in the accompanying drawings, wherein Figure 1 is a top plan view of a baking pan constructed in accordance with one embodiment of this invention. Fig. 2 is a side elevation of the device shown in Fig. 1. Fig. 3 is an end elevation thereof. Fig. 4 is a view similar to Fig. 3 of a slightly modified arrangement. Fig. 5 is a horizontal sectional view on the line 5—5 of Fig. 3. Fig. 6 is a sectional view of one form of the joint between two adjacent bread pans and Fig. 7 is a similar view showing the manner of forming the joint. Fig. 8 is a view similar to Fig. 6 on an enlarged scale. Fig. 9 is a view similar to Fig. 8 of a different form of joint and Fig. 10 is a transverse sectional view on the line 10—10 of Fig. 1.

The particular embodiment of this invention which has been chosen for the purposes of illustration includes a plurality of individual bread pans which are assembled side by side to be rigidly fastened into a unitary baking utensil. The adjacent edges of the bread pans are secured together instead of being merely positioned adjacent each other and the exposed upper edges of the bread pans are beaded so as to receive and secure a wire which surrounds the upper edges of the pans. End plates are secured to the sides of the end pans, which form the ends of the finished structure, and the rivets securing the bottom of these end plates to the associated pans are the only rivets in the entire structure which project into the interior of the pans. Straps are secured to the upper portions of the end plates and extend longitudinally beneath the wire which is secured to the straps by means of cross braces extending under and supporting the joints between adjacent pans and the ends of the cross braces are so shaped as to securely clamp the box holding wire to the surrounding strap. In this way the entire structure is held in assembled relation without the necessity of providing any riveted joints between the binding straps themselves and the boxes, the only rivets employed being those for securing the strap supporting end plates in position.

As illustrated, this invention includes a plurality of individual bread pans 11 which are arranged side by side and the adjacent edges of which are secured together as hereinafter more fully described. The exposed edges of the pans are provided with beads 12 and a pan holding wire 13 surrounds the assembled pans and is secured within the aligned beaded edges. The exposed sides of the end pans 11 form the ends of the assembled structure and strap supporting end plates 14 are secured to the exposed sides of the end pans 11 by rivets 15 which are applied to the lower corners thereof. These constitute the only rivets which enter the interior of any of the bread pans and being in the lower corners of these pans they are placed in the most inconspicuous part so that the impression made thereby upon the loaves of bread will not be noticeable.

Straps 16 extend longitudinally along the assembled units beneath the beads 12 and holding wire 13 and the bent ends 17 of each strap are riveted to a folded portion 18 of the upper corner of each end plate 14 and the rivets 19 extend only through the strap 16 and folded portion 18 of the end plate.

Instead of riveting the straps 16 to each individual pan for the purpose of providing a riveted assembly I clamp the intermediate bands to the straps by an improved form of construction which, as illustrated, includes cross braces 20 extending transversely across the assembly beneath the joined edges of each pair of adjacent pans. The ends 21 of each cross member extend from beneath the box joint upwardly over the adjacent holding wire 13 and then downwardly and around the adjacent strap 16 so as to rigidly and securely clamp the box holding wire 13 to the heavy strap 16. The box holding wire 13 being received within the beaded edges 12 of the boxes is so securely held as to, in effect, constitute a part of the boxes themselves. The cross members 20 by clamping the holding wires 13 to the straps effectively secure the assembled boxes together so as to form a rigid unitary structure.

Figs. 6, 7 and 8 illustrate one manner of joining the adjacent edges of the adjacent ends. As illustrated, the edges instead of being beaded are bent outwardly to form flat ledges 22, the downwardly bent edges of which are received within a generally U-shaped clamping member 23 and the joint then pressed to the shape illustrated in Fig. 8, wherein it is shown supported by the cross member 20 as in the assembled structure. The ledge 22 may be formed without the provision of a clamping member 23 as illustrated in Fig. 9, wherein the associated ledges are merely positioned adjacent each other and directly supported by the associated cross member 20.

In Fig. 4 is illustrated an alternative form wherein the end plates 14 are spot welded to the associated pans instead of being riveted so as to eliminate even the two end plate holding rivets and form a rivetless baking pan. In this case the strap ends 17 are also spot welded to the supporting end plate.

Although I have described a specific embodiment of this invention, various changes, additions, substitutions and omissons can be made therein without departing from the spirit of this invention or the scope of the appended claims.

What I claim as new and desire to secure by Letters Patent is:

1. A baking utensil having in combination a plurality of individual baking pans having beaded outer edges adapted to receive a wire extending therethrough for holding said pans in assembled relation, end plates secured to said pans, relatively heavy straps secured to said end plates and extending longitudinally beneath said wire, cross members for supporting the inner adjacent edges of said pans, the ends of said cross members being formed so as to rigidly secure said wire to said straps.

2. A baking device having in combination a plurality of pans, clamps for securing the bent edges of adjacent pans together, the outer edges of said pans being beaded, a wire extending through said beaded edges for holding said pans together, end plates secured to the exposed sides of the end pans, straps connecting said plates and extending past said pans adjacent said wire and cross braces extending under the joined edges of each adjacent pair of pans, said braces having their ends extending above said wire and formed so as to secure said wire to said straps.

3. A baking device having in combination a plurality of pans, a wire secured to and extending circumferentially around said pans for holding said pans in assembled relation, a strap extending longitudinally along each side of the assembly, means for securing the ends of each strap to the assembly and braces extending under the adjacent edges of said pans, the ends of said braces being formed so as to secure said wire to said straps.

4. A baking device having in combination a plurality of individual pans, a circumferentially extending wire secured to the tops of said pans, a strap mechanism surrounding said pans and means supporting the adjacent edges of said pans and securing said circumferential wire to said strap mechanism.

5. A baking device having in combination a plurality of individual pans, a circumferentially extending wire secured to the tops of said pans, a strap mechanism surrounding said pans and bracing members securing said wire to said mechanism and extending under the adjacent edges of said pans so as to form supports therefor.

In testimony whereof, I have hereunto subscribed my name this 16th day of August, 1926.

HENRY M. SCHWAB.